(12) United States Patent
Kang et al.

(10) Patent No.: US 8,624,106 B2
(45) Date of Patent: Jan. 7, 2014

(54) ELECTRODE FOR DYE SENSITIZED SOLAR CELL, METHOD OF MANUFACTURING THE SAME, AND DYE SENSITIZED SOLAR CELL USING THE ELECTRODE

(75) Inventors: Moon-Sung Kang, Yongin-si (KR); Ji-Won Lee, Yongin-si (KR); Byong-Cheol Shin, Yongin-si (KR); Si-Young Cha, Yongin-si (KR); Do-Young Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 376 days.

(21) Appl. No.: 12/908,682

(22) Filed: Oct. 20, 2010

(65) Prior Publication Data

US 2011/0272007 A1    Nov. 10, 2011

(30) Foreign Application Priority Data

May 6, 2010    (KR) .................. 10-2010-0042581

(51) Int. Cl.
*H01L 31/00*    (2006.01)

(52) U.S. Cl.
USPC .......................... 136/256; 136/252; 136/263

(58) Field of Classification Search
USPC .................... 136/250, 252, 256, 263
See application file for complete search history.

(56) References Cited

U.S. PATENT DOCUMENTS

| 2006/0107997 | A1 | 5/2006 | Matsui et al. |
| 2007/0169815 | A1 | 7/2007 | Kim et al. |
| 2009/0155632 | A1 | 6/2009 | Byun et al. |
| 2009/0173920 | A1* | 7/2009 | Kang et al. ............ 252/514 |
| 2009/0211639 | A1 | 8/2009 | Park et al. |
| 2009/0250106 | A1* | 10/2009 | Hayashi et al. ........... 136/256 |

FOREIGN PATENT DOCUMENTS

| JP | 2000-91609 | 3/2000 |
| JP | 2001-250595 | 9/2001 |
| JP | 2002-093475 | 3/2002 |
| JP | 2005-158380 | 6/2005 |
| JP | 2007-021974 | 2/2007 |
| JP | 2007-103020 | 4/2007 |
| JP | 2007-179822 | 7/2007 |
| KR | 10-2006-0030574 | 4/2006 |
| KR | 10-2006-0104821 | 10/2006 |
| KR | 10-0661116 B | 12/2006 |
| KR | 10-2007-0076877 | 7/2007 |
| KR | 10-0773147 | 10/2007 |
| KR | 2009-0091869 A | 8/2009 |
| KR | 10-2010-0011184 | 2/2010 |

OTHER PUBLICATIONS

Korean Office Action dated Sep. 20, 2011 issued in Korean Application No. 10-2010-0042581, 5 pages.
Korean Notice of Allowance dated Apr. 9, 2012 issued to Korean priority patent application No. 10-2010-0042581, 5 pages.

* cited by examiner

*Primary Examiner* — Jonathan Johnson
*Assistant Examiner* — Lindsey Bernier
(74) *Attorney, Agent, or Firm* — Christie, Parker & Hale, LLP (57) ABSTRACT

An electrode for a dye sensitized solar cell, the electrode including platinum having a controlled surface roughness and a specific surface area of platinum, a method of manufacturing the electrode, and a dye sensitized solar cell having excellent photoelectric conversion efficiency by including the electrode.

8 Claims, 10 Drawing Sheets

ELECTRODE FOR DYE SENSITIZED SOLAR CELL, METHOD OF MANUFACTURING THE SAME, AND DYE SENSITIZED SOLAR CELL USING THE ELECTRODE

CROSS-REFERENCE TO RELATED APPLICATION

This application claims the benefit of Korean Patent Application No. 10-2010-0042581, filed on May 6, 2010, in the Korean Intellectual Property Office, the entire content of which is incorporated herein by reference.

BACKGROUND

1. Field

One or more embodiments of the present invention relate to an electrode for a dye sensitized solar cell, a method of manufacturing the same, and a dye sensitized solar cell including the electrode.

2. Description of Related Art

Solar cells, such as silicon-based solar cells and dye sensitized solar cells, are eco-friendly energy sources.

Since the costs for manufacturing silicon-based solar cells are expensive, it is difficult to commercialize silicon-based solar cells and/or improve their efficiency. On the other hand, the costs for manufacturing dye sensitized solar cells are far less expensive than those of the conventional silicon-based solar cells so that dye sensitized solar cells may replace silicon-based solar cells. Dye sensitized solar cells are photo-electrochemical solar cells including dye molecules that absorb visible light to generate electron-hole pairs and transition metal oxide that transfers the generated electrons as main components.

A dye sensitized solar cell includes a counter electrode including a catalyst and an electrolyte having redox pairs. The counter electrode consecutively supplies electrons to cells by reducing ions.

The catalyst may be platinum (Pt), carbon (C), or a conductive polymer, and among these elements, platinum has the highest efficiency. However, since platinum is also very expensive, research is being conducted into reducing the amount of platinum in order to reduce the manufacturing costs and also prevent the decrease in efficiency caused by the reduction of the amount of platinum.

SUMMARY OF THE INVENTION

One or more embodiments of the present invention are directed toward an electrode for a dye sensitized solar cell having excellent photoelectric conversion efficiency, a method of manufacturing the electrode, and a dye sensitized solar cell including the electrode.

Additional aspects will be set forth in part in the description which follows and, in part, will be apparent from the description, or may be learned by practice of the presented embodiments.

According to one or more embodiments of the present invention, an electrode for a dye sensitized solar cell includes platinum (Pt) having a specific surface area in a range of about 20 to about 50 $m^2/g$ (or of 20 to 50 $m^2/g$). In addition, the electrode has a surface roughness (RMS) in a range of about 10 to about 30 nm (or of 10 to 30 nm).

In one embodiment, the grain size of platinum is in a range of about 1 to about 30 nm.

In one embodiment, the electrode further includes metal oxide particles. In one embodiment, the metal oxide includes titania, silica, and/or indium tin oxide. In one embodiment, the amount of the metal oxide particles is in a range of about 100 to about 500 parts (or of 100 to 500 parts) by weight based on 100 parts by weight of platinum.

According to one or more embodiments of the present invention, a method of manufacturing an electrode for a dye sensitized solar cell includes: preparing an electrode composition by mixing a platinum salt, a low-volatile solvent, and a binder; and printing the electrode composition on a substrate and heat-treating the electrode composition.

In one embodiment, the binder includes ethyl cellulose and/or polyethylene glycol.

In one embodiment, the binder is in the electrode composition at an amount between about 800 and about 1,500 parts (or between 800 and 1,500 parts) by weight based on 100 parts by weight of the platinum salt.

In one embodiment, the electrode composition further includes a material for forming a micelle with the platinum salt. In one embodiment, the material for forming the micelle with the platinum salt is a polyethylene oxide (PEO1)-polypropylene oxide (PPO) block copolymer and/or a polyethylene oxide (PEO1)-polypropylene oxide (PPO)-polyethylene oxide (PEO2) block copolymer. In one embodiment, the material for forming the micelle with the platinum salt is in the electrode composition at an amount between about 250 and about 1,000 parts by weight based on 100 parts by weight of the platinum salt.

In one embodiment, the electrode composition further includes metal oxide particles. In one embodiment, the metal oxide comprises titania, silica, and/or indium tin oxide. In one embodiment, the amount of the metal oxide particles is in the electrode composition at an amount between about 100 and about 500 parts (or between 100 and 500 parts) by weight based on 100 parts by weight of the platinum salt.

In one embodiment, the heat-treatment is performed at a temperature in a range of about 400 to about 500° C. (or of 400 to 500° C.).

According to one or more embodiments of the present invention, a dye sensitized solar cell includes: a first electrode; a photoreceptive layer formed on a surface of the first electrode; a second electrode including a transparent electrode and a catalyst electrode and disposed to face the surface of the first electrode on which the photoreceptive layer is formed; and an electrolyte disposed between the photoreceptive layer and the second electrode, wherein the catalyst electrode is the electrode described above.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

An electrode for a dye sensitized solar cell according to an embodiment of the present invention includes platinum (Pt) having a specific surface area in a range of about 20 to about 50 $m^2/g$ and an electrode having a surface roughness (RMS) in a range of about 10 to about 30 nm.

In one embodiment, the RMS of the electrode is in the range of about 15 to about 25 nm, and the specific surface area of platinum is in the range of about 30 to about 45 $m^2/g$.

The electrode for a dye sensitized solar cell may further include metal oxide particles. The metal oxide particles may scatter light so as to improve photoavailability of the electrode.

The metal oxide may include titania, silica, and/or indium tin oxide, and the amount of the metal oxide particles may be in the range of about 100 to about 500 parts by weight, for example, about 250 to about 400 parts by weight, based on 100 parts by weight of platinum.

In one embodiment, if the amount of the metal oxide particles is within the range described above, the specific surface area of the platinum electrode increases and photoavailability improves.

An average diameter of platinum particles may be in the range of about 1 to about 20 nm, for example, about 5 to about 15 nm, and an average diameter of the metal oxide particles may be in the range of about 20 to about 100 nm, for example, about 30 to about 70 nm. In one embodiment, if the average diameters of platinum particles and the metal oxide particles are within the ranges described above, photoavailability of the electrode and platinum catalyst characteristics for reducing an electrolyte improves.

Hereinafter, a method of manufacturing the electrode for a dye sensitized solar cell will be described in more detail.

First, an electrode composition is prepared by mixing a platinum salt, a low-volatile solvent, and a binder.

The platinum salt may be chloroplatinic acid ($H_2PtCl_6$), platinum(II) acetylacetonate, or any mixture thereof.

The low-volatile solvent may be α-terpineol, butyl carbitol acetate (BCA), or any mixture thereof, and the amount of the low-volatile solvent may be in the range of about 5,000 parts to about 12,000 parts by weight based on 100 parts by weight of the platinum salt. When the amount of the low-volatile solvent is within the range described above, components of the electrode composition are uniformly mixed and dispersed in the electrode composition and the electrode composition has a viscosity suitable for printing.

The binder may be ethyl cellulose, glycol polyethylene, or the like. The binder may be EC100 purchased from Kanto Chemical Co., Inc., Japan.

The amount of the binder may be in the range of about 800 to about 1,500 parts by weight based on 100 parts by weight of the platinum salt. When the amount of the binder is within this range, the electrode may have a strong binding ability to a substrate.

The electrode composition may further include a material that forms a micelle with the platinum salt.

A surfactant having a hydrophilic group and a hydrophobic group that are separated from each other may be used as the material that forms a micelle with the platinum salt. By adding the surfactant, the grain size of platinum may be controlled in a platinum-containing electrode.

By forming the micelle with platinum, the grain size of platinum may be controlled. The micelle formed as described above is removed during a subsequent heat-treatment, so that a platinum electrode having controlled surface roughness and specific surface area may be obtained.

The grain size of platinum in the platinum electrode may be in the range of about 1 to about 30 nm, for example, about 10 to about 25 nm.

The term "grain size" used herein refers to a diameter of a grain formed of a single particle or an average diameter of a grain formed of a plurality of particles.

The material that forms a micelle with the platinum salt may be a polyethylene oxide (PEO1)-polypropylene oxide (PPO) block copolymer or a polyethylene oxide (PEO1)-polypropylene oxide (PPO)-polyethylene oxide (PEO2) block copolymer.

The PEO1-PPO-PEO2 block copolymer may be commercially available from BASF Corp. (Pluronic P123).

The amount of the PPO repeating unit contained in the block copolymer may be in the range of about 1 to about 3 moles based on 1 mole of the PEO1 repeating unit, and the amount of the PEO2 repeating unit may be in the range of about 0.1 to about 1 mole based on 1 mole of the PEO1 repeating unit.

The amount of the material that forms the micelle with the platinum salt may be in the range of about 250 to about 1,000 parts by weight, for example, about 400 to about 800 parts by weight, based on 100 parts by weight of the platinum salt.

The electrode composition may further include metal oxide particles.

The metal oxide may include titania, silica, and/or indium tin oxide, and the amount of the metal oxide particles may be in the range of about 100 to about 500 parts by weight based on 100 parts by weight of platinum salt.

Then, the electrode composition is printed on a substrate and heat-treated.

The heat-treatment may be performed at a temperature in a range of about 400 to about 500° C.

When the temperature for the heat-treatment is within the range described above, catalyst characteristics of the electrode may be improved.

According to the above process, an electrode including platinum having a surface roughness (RMS) in the range of about 10 to about 30 nm, a specific surface area of platinum in the range of about 20 to about 50 $m^2/g$, and a grain size of platinum in the range of about 10 to about 30 nm may be prepared. The electrode according to the current embodiment is not surface-treated using UV/ozone, while a comparable platinum electrode is surface-treated using UV/ozone. Here, the electrode according to the current embodiment has excellent transmittance without a surface treatment.

The electrode composition is a composition for screen printing suitable for a large electrode. An electrode prepared using the electrode composition is used as a counter electrode of a dye sensitized solar cell.

The surface roughness of the electrode including platinum is measured by measuring arithmetical average roughness (Ra) using an atomic force microscope (AFM).

The grain size of platinum contained in the electrode is measured using a transmission electron microscope (TEM) analyzer.

Figure 1:
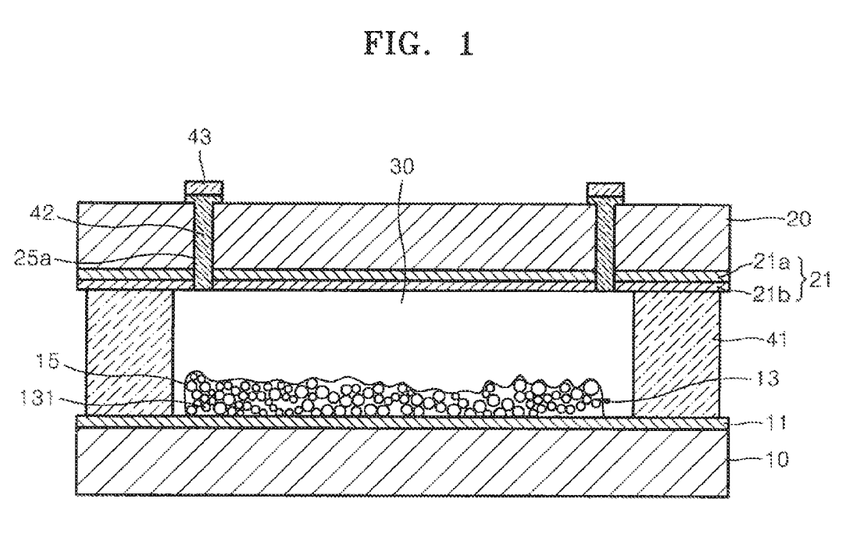
FIG. 1 is a cross-sectional view of a dye sensitized solar cell according to an embodiment of the present invention.

FIG. 1 is a cross-sectional view of a dye sensitized solar cell according to an embodiment of the present invention.

Referring to FIG. 1, the dye sensitized solar cell according to the current embodiment includes a first substrate 10 on which a first electrode 11, a photoelectrode 13, and a dye 15 are formed; a second substrate 20 on which a second electrode 21 is formed; and an electrolyte 30 disposed between the first electrode 11 and the second electrode 21, wherein the first substrate 10 and the second substrate 20 face each other. A case may be formed outside of the first substrate 10 and the second substrate 20. The structure will be described in more detail below.

The first substrate 10 which supports the first electrode 11 is transparent and thus external light can incident onto and pass through the first substrate 10. The first substrate 10 may be formed of glass or plastic. Non-limiting examples of the plastic include polyethylene terephthalate (PET), polyethylene naphthalate (PEN), polycarbonate (PC), polypropylene (PP), polyimide (PI), and triacetyl cellulose (TAC).

The first electrode 11 formed on the first substrate 10 may be formed of at least one transparent material selected from the group consisting of indium tin oxides, indium oxides, tin oxides, zinc oxides, sulfur oxides, fluorine oxides, mixtures thereof, $ZnO$—$Ga_2O_3$, and $ZnO$—$Al_2O_3$. The first electrode 11 may have a single or multi-layered structure including the transparent material.

The photoelectrode 13 is formed on the first electrode 11. The photoelectrode 13 includes the titanium dioxide particles 131. An appropriate average pore size may improve necking characteristics of the titanium dioxide particles 131 since the electrolyte 30 is easily transferred.

The thickness of the photoelectrode 13 may be in the range of about 10 to about 3000 nm, for example, about 10 to about 1000 nm. However, the thickness of the photoelectrode 13 is not limited thereto.

The dye 15, which absorbs external light and generates excited electrons, is adsorbed into the surface of the photoelectrode 13.

The dye 15 may be an organic dye that has excellent molar extinction coefficient and high photoelectric efficiency in a wavelength range of visible light, is inexpensive, and may replace expensive inorganic ruthenium dyes.

Also, the second substrate 20 which supports the second electrode 21 and disposed to face the first substrate 10 may be transparent. The second substrate 20, like the first substrate 10, may also be formed of glass or plastic.

The second electrode 21 formed on the second substrate 20 is disposed to face the first electrode 11, and may include a transparent electrode 21a and a catalyst electrode 21b.

The transparent electrode 21a may be formed of a transparent material such as an indium tin oxide, a fluoro tin oxide, an antimony tin oxide, a zinc oxide, a tin oxide, $ZnO$—$Ga_2O_3$, $ZnO$—$Al_2O_3$, or the like. In this regard, the transparent electrode 21a may have a single or multi-layered structure including the transparent material.

The catalyst electrode 21b activates a redox couple, and a platinum electrode according to the current embodiment is used as the catalyst electrode 21b.

The first substrate 10 is assembled to the second substrate 20 using an adhesive agent 41. The electrolyte 30 is injected into the space between the first electrode 11 and the second electrode 21 through a hole 25a penetrating the second substrate 20 and the second electrode 21. The electrolyte 30 is uniformly dispersed in the photoelectrode 13. The electrolyte 30 transfers electrons from the second electrode 21 to the dye 15 through oxidation and reduction. The hole 25a penetrating the second substrate 20 and the second electrode 21 is sealed using an adhesive agent 42 and a cover glass 43.

A suitable porous membrane may further be formed between (or on) the upper surface of the first electrode 11 and the lower surface of the photoelectrode 13. In this regard, the photoelectrode 13 functions as a light scattering electrode and adsorbs a large amount of the dye 15 so that the efficiency of the dye sensitized solar cell increases.

The porous membrane is formed of particles of a metal oxide such as a titanium oxide, a zinc oxide, a tin oxide, a strontium oxide, an indium oxide, an iridium oxide, a lanthan oxide, a vanadium oxide, a molybdenum oxide, a tungsten oxide, a niobium oxide, a magnesium oxide, an aluminum oxide, a yttrium oxide, a scandium oxide, a samarium oxide, a gallium oxide, a strontium titanium oxide, or the like. In this regard, the metal oxide may be $TiO_2$, $SnO_2$, $WO_3$, $ZnO$, or a complex thereof.

The electrolyte includes iodine ($I_2$) and/or iodide salt.

In one embodiment, the iodide salt is selected from the group consisting of lithium iodides, sodium iodides, potassium iodides, magnesium iodides, copper iodides, silicon iodides, manganese iodides, barium iodides, molybdenum iodides, calcium iodides, iron iodides, cesium iodides, zinc iodides, mercury iodides, ammonium iodides, methyl iodides, methylene iodides, ethyl iodides, ethylene iodides, isopropyl iodides, isobutyl iodides, benzyl iodides, benzoyl iodides, allyl iodides, imidazolium iodides, and combinations thereof.

The iodide salt may be in a range of about 150 to about 3000 parts by weight based on 100 parts by weight of iodine ($I_2$).

The electrolyte may selectively include an organic solvent.

The organic solvent may be acetonitirle (AN), ethylene glycol, butanol, isobutyl alcohol, isopentyl alcohol, isopropyl alcohol, ethyl ether, dioxane, tetrahydrobutane, tetrahydrofuran, n-butyl ether, propyl ether, isopropyl ether, acetone, methyl ethyl ketone, methyl butyl ketone, methyl isobutyl ketone, ethylene carbonate (EC), diethyl carbonate (DEC), propylene carbonate (PC), dimethyl carbonate (DMC), ethyl methyl carbonate (EMC), gamma-butyrolactone (GBL), N-methyl-2-pyrrolidone, and/or 3-methoxypropionitrile (MP).

In one embodiment, content of the organic solvent is in a range of about 10 to about 90 parts by weight based on a total content of the electrolyte, that is, 100 parts by weight.

Hereinafter, one or more embodiments of the present invention will be described in detail with reference to the following examples. These examples are not intended to limit the purpose and scope of the one or more embodiments of the present invention.

Comparative Example 1

Preparation of Platinum Catalyst Layer

A platinum salt ($H_2PtCl_6$) was dissolved in isopropyl alcohol (IPA) to prepare platinum salt solutions having molarities of 0.0025, 0.0050, 0.100, 0.025, and 0.050 M. In this regard, weight percents of the platinum salt solutions with respect to molarities are shown in Table 1 below.

The platinum salt solution was coated on fluorine doped tin oxide (FTO) glass substrate using a spin coater, rotated at 2,000 rpm for 15 seconds, and baked at 400° C. for 30 minutes to form a platinum catalyst layer.

TABLE 1

|   | Molarity (M) | Wt % |
|---|---|---|
| 1 | 0.0025 | 0.166 |
| 2 | 0.0050 | 0.331 |
| 3 | 0.0100 | 0.659 |
| 4 | 0.0250 | 1.631 |
| 5 | 0.0500 | 3.210 |

Comparative Example 2

Preparation of Platinum Catalyst Layer

A platinum catalyst layer was formed by depositing platinum on a FTO glass substrate at 100 W for 20 minutes using a sputter.

Example 1

Preparation of Platinum Catalyst Layer

Ethyl cellulose (EC100, Kanto Chemical Co., Inc., Japan) as a binder was added to a mixture of α-terpineol and butyl carbitol acetate (BCA) in a weight ratio of 7:3, and the mixture was stirred at 60° C. overnight to prepare a high viscosity paste.

The platinum salt ($H_2PtCl_6$) having the same weight of that of Comparative Example 1 was added to the high viscosity paste, and the mixture was mixed at 2,000 rpm for about 10 minutes using a Tinky mixer to prepare a paste for a platinum catalyst layer.

The paste was coated on a FTO glass substrate using a polyester screen and baked at 400° C. for 30 minutes to form a platinum catalyst layer.

The grain size of platinum of the platinum catalyst layer was about 12 nm.

The grain size of platinum was measured using a transmission electron microscopy (TEM) analyzer.

Example 2

Preparation of Platinum Catalyst Layer

A platinum salt paste was prepared in the same manner as in Example 1, except that P123 (Pluronic, BASF Corp.) that forms a micelle with the platinum salt ($H_2PtCl_6$) was added to prepare the high viscosity paste. In this regard, the weight ratios of EC100 and P123 were 8:2, 6:4, and 4:6.

The paste was coated on a FTO glass substrate using a polyester screen and baked at 400° C. for 30 minutes to form a platinum catalyst layer.

Weight ratios of EC100 and P123 used in Examples 1 and 2 are shown in Table 2 below.

TABLE 2

|   |   | Weight ratio of EC100 and P123 |
|---|---|---|
| Example 1 |   | 10:0 |
| Example 2 | A | 8:2 |
|   | B | 0.66:459 |
|   | C | 4:6 |

Figure 2A:
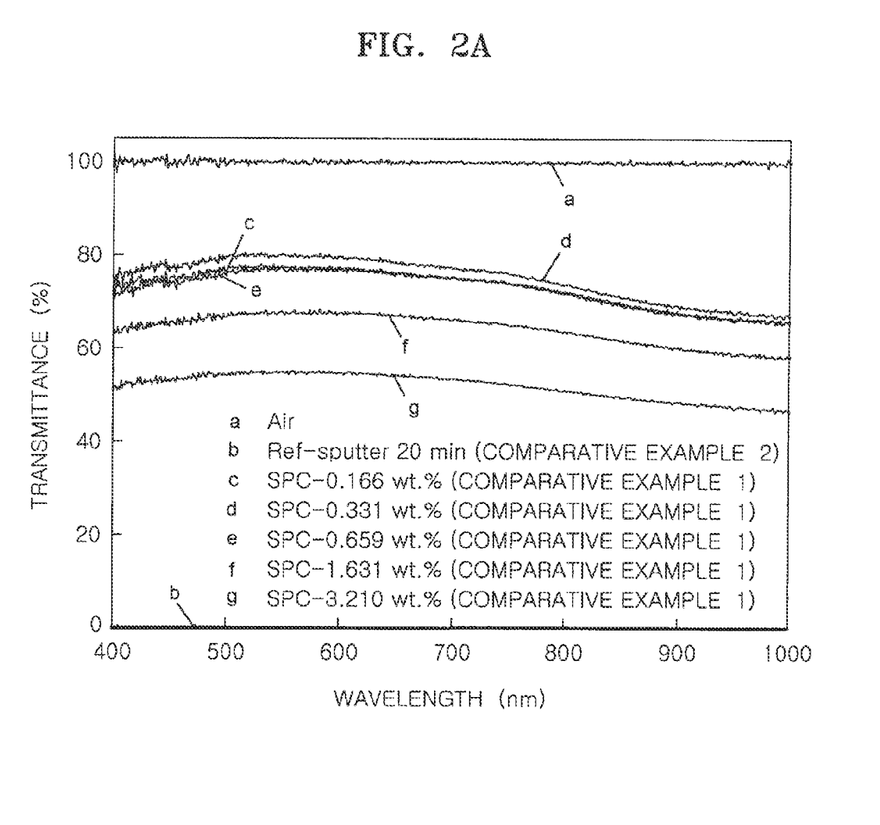
FIG. 2A is a graph illustrating transmittance of electrodes including platinum catalyst layers prepared according to Comparative Examples 1 and 2.
Figure 2B:
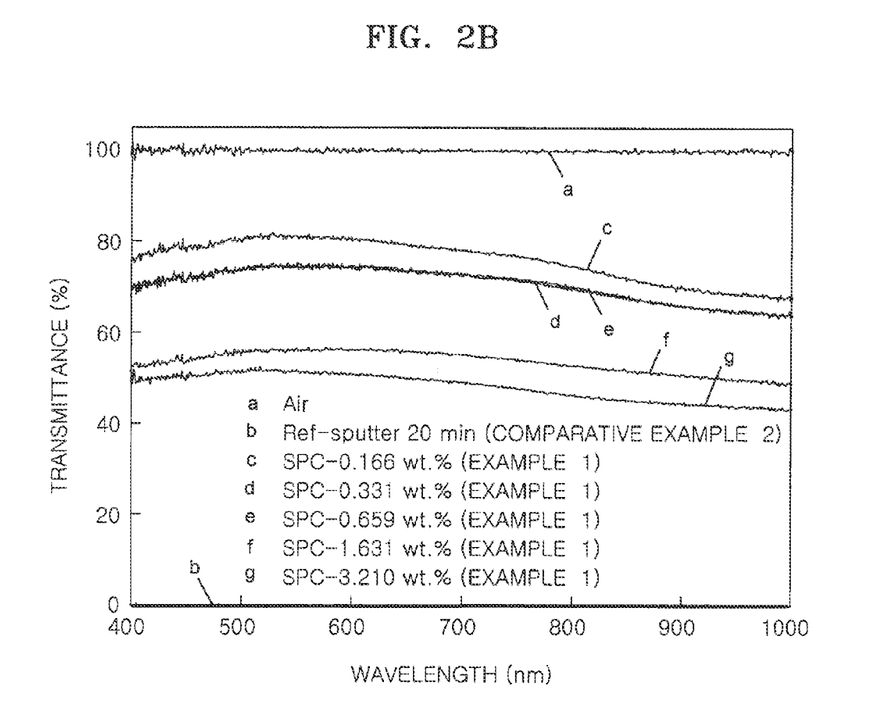
FIG. 2B is a graph illustrating transmittance of electrodes including platinum catalyst layers prepared according to Example 1 and Comparative Example 2.

Transmittance of electrodes including the platinum catalyst layers prepared according to Example 1 and Comparative Examples 1 and 2 were measured, and the results are shown in FIGS. 2A and 2B, and Table 3 below.

Referring to FIGS. 2A and 2B, and Table 3, the transmittance of the platinum catalyst layer prepared according to Example 1 was similar to that of the platinum catalyst layer prepared according to Comparative Example 1 in the condition of the same platinum salt content. While the FTO transparent conductive substrate including the platinum catalyst layer having about 0.659 wt % or less platinum salt has a transmittance of about 70% or greater, the FTO transparent conductive substrate including the platinum catalyst according to Comparative Example 2 was about 0.01%.

TABLE 3

|   | Sample | Transmittance (%) |
|---|---|---|
| Comparative Example 2 | Ref-Sputt-20 min | 0.01 |
| Comparative Example 1 | S1-0.166 wt. % | 77.14 |
|   | S2-0.331 wt. % | 79.61 |
|   | S3-0.659 wt. % | 76.63 |
|   | S4-1.631 wt. % | 67.40 |
|   | S5-3.210 wt. % | 54.65 |
| Example 1 | P1-0.166 wt. % | 80.69 |
|   | P2-0.331 wt. % | 79.82 |
|   | P3-0.659 wt. % | 77.59 |
|   | P4-1.631 wt. % | 68.81 |
|   | P5-3.210 wt. % | 59.45 |

Dye sensitized solar cells were manufactured according to the following method, by using the platinum catalyst layers prepared according to Example 1 and Comparative Examples 1 and 2.

Comparative Preparation Example 1

Manufacturing of Dye Sensitized Solar Cell

A dispersion of titanium oxide particles having a particle diameter of about 10 nm was coated on 1 $cm^2$ of an ITO conductive film as a first electrode using a doctor blade, and the coating was baked at 450° C. for 30 minutes to prepare a porous membrane having a thickness of 10 μm.

Then, the resultant was maintained at 80° C. and immersed in a dye dispersion prepared by dispersing N719 as a ruthenium complex dye in ethanol to a concentration of 0.3 mM for 12 hours or more for adsorbing the dye into the resultant.

N719

Then, the dye-adsorbed porous membrane was washed with ethanol and dried at room temperature to prepare a first electrode on which the photoreceptive layer is formed.

Separately, a second electrode was prepared by forming a platinum catalyst electrode on the first conductive film formed of ITO as described in Comparative Example 1, and a micropore was formed for injecting an electrolyte using a drill having a diameter of 0.75 mm.

A support having a thickness of 60 μm and formed of a thermoplastic polymer film (Surlyn, DuPont, USA) was disposed between the first electrode and the second electrode, and the resultant was pressed at 100° C. for 9 seconds to assemble the first and second electrodes. Then, an electrolyte was injected through the micropore formed in the second electrode, and then the micropore was sealed using a cover glass and a thermoplastic polymer film to prepare a dye sensitized solar cell. The electrolyte was prepared by dissolving 0.6M of 1,2-dimethyl-3-hexylimidazolium iodide, 0.5M of 4-tertbutylpirimidine, 0.1M of LiI, and 0.05M of $I_2$ in acetonitrile solvent.

Comparative Preparation Example 2

Manufacturing of Dye Sensitized Solar Cell

A dispersion of titanium oxide particles having a particle diameter of about 10 nm was coated on an area of 1 cm² of an ITO conductive film as a first electrode by using a doctor blade, and the coating was baked at 450° C. for 30 minutes to prepare a porous membrane having a thickness of 10 μm.

Then, the resultant was maintained at 80° C. and immersed in a dye dispersion prepared by dispersing N719 as a ruthenium complex dye in ethanol to a concentration of 0.3 mM for 12 hours or more for adsorbing the dye into the resultant.

Then, the dye-adsorbed porous membrane was washed with ethanol and dried at room temperature to prepare a first electrode on which the photoreceptive layer is formed.

Separately, a second electrode was prepared by depositing a second conductive film formed of Pt on a transparent electrode formed of ITO using a sputter in Comparative Example 2, and a micropore was formed for injecting an electrolyte using a drill having a diameter of 0.75 mm.

A support having a thickness of 60 μm and formed of a thermoplastic polymer film (Surlyn, DuPont, USA) was disposed between the first electrode and the second electrode, and the resultant was pressed at 100° C. for 9 seconds to assemble the first and second electrodes. Then, an electrolyte was injected through the micropore formed in the second electrode, and then the micropore was sealed using a cover glass and a thermoplastic polymer film to prepare a dye sensitized solar cell. The electrolyte was prepared by dissolving 0.6M of 1,2-dimethyl-3-hexylimidazolium iodide, 0.5M of 4-tertbutylpirimidine, 0.1M of LiI, and 0.05M of $I_2$ in acetonitrile solvent.

Preparation Example 1

Manufacturing of Dye Sensitized Solar Cell

A dye sensitized solar cell was prepared in the same manner as in Comparative Example 1, except that a platinum electrode was formed on a transparent electrode formed of ITO when a second electrode was formed in the same manner as in Example 1.

Preparation Example 2

Manufacturing of Dye Sensitized Solar Cell

A dye sensitized solar cell was prepared in the same manner as in Comparative Example 1, except that a platinum electrode was formed on a transparent electrode formed of ITO when a second electrode was formed in the same manner as in Example 2.

Open circuit voltage ($V_{OC}$), photocurrent density (Jsc), energy conversion efficiency ($E_{ff}$), and fill factor (FF) of the dye sensitized solar cells manufactured according to Preparation Example 1 and Comparative Preparation Example 1 were measured.

Conditions for measuring the open circuit voltage, photocurrent density, energy conversion efficiency, and fill factor shown in Table 4 below are as follows.

(1) Open circuit voltage ($V_{OC}$) and photocurrent density (mA/cm²): Open circuit voltage and photocurrent density were measured using Keithley SMU2400.

(2) Energy conversion efficiency (%) and fill factor (%): Energy conversion efficiency was measured using a solar simulator having 1.5 AM 100 mW/cm² (Xe lamp [300 W, Oriel], AM1.5 filter, and Keithley SMU2400), and fill factor was measured using the obtained energy conversion efficiency and the following equation.

$$\text{FILL FACTORY (\%)} = \frac{(J*V)_{max}}{J_{sc}*V_{oc}}*100 \quad \text{Equation}$$

In the equation, J is a value on Y axis, V is a value on X axis, and Jsc and Voc are respectively the Y-intercept and X-intercept of the graph of energy conversion efficiency.

TABLE 4

| | Counter electrode | Concentration/ wt. % | Jsc/mA cm$^{-2}$ | Voc/ V | FF/ % | Eff/ % |
|---|---|---|---|---|---|---|
| Comparative Preparation Example 1 | S-1 | 0.166 | 16.303 | 0.788 | 67.6 | 8.69 |
| | S-2 | 0.331 | 16.707 | 0.755 | 68.7 | 8.66 |
| | S-3 | 0.659 | 17.535 | 0.756 | 68.2 | 9.05 |
| | S-4 | 1.631 | 17.299 | 0.759 | 69.3 | 9.10 |
| | S-5 | 3.210 | 18.111 | 0.737 | 70.3 | 9.00 |
| Preparation Example 1 | P-1 | 0.166 | 16.813 | 0.795 | 65.9 | 8.81 |
| | P-2 | 0.331 | 17.444 | 0.762 | 67.4 | 8.96 |
| | P-3 | 0.659 | 17.955 | 0.756 | 69.8 | 9.48 |
| | P-4 | 1.631 | 17.517 | 0.773 | 68.9 | 9.32 |
| | P-5 | 3.210 | 17.824 | 0.758 | 66.8 | 9.03 |

Figure 3A:
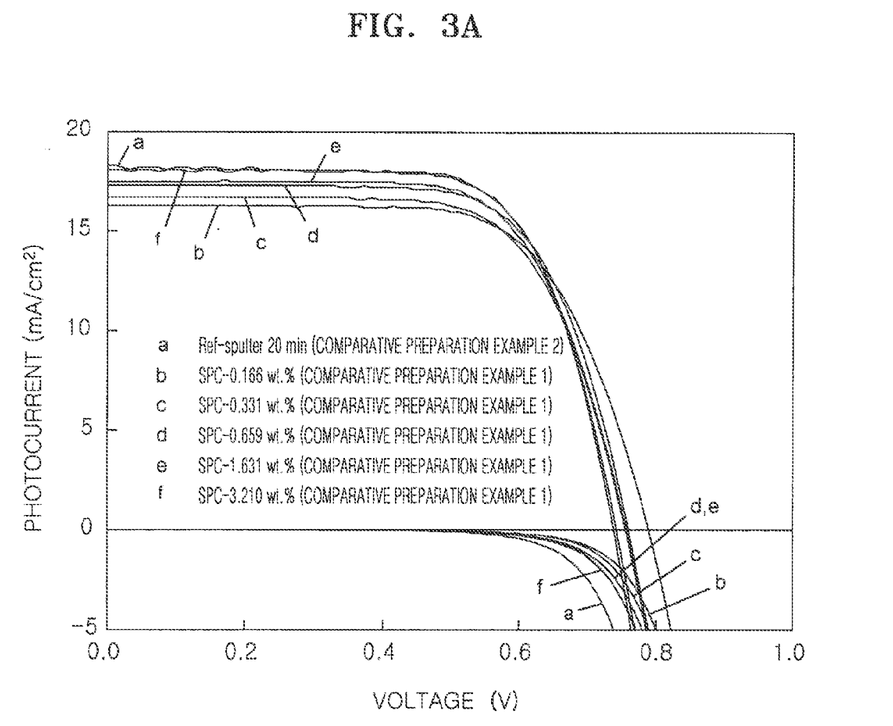
FIG. 3A is a graph illustrating current-voltage characteristics of dye sensitized solar cells prepared according to Comparative Preparation Examples 1 and 2.
Figure 3B:
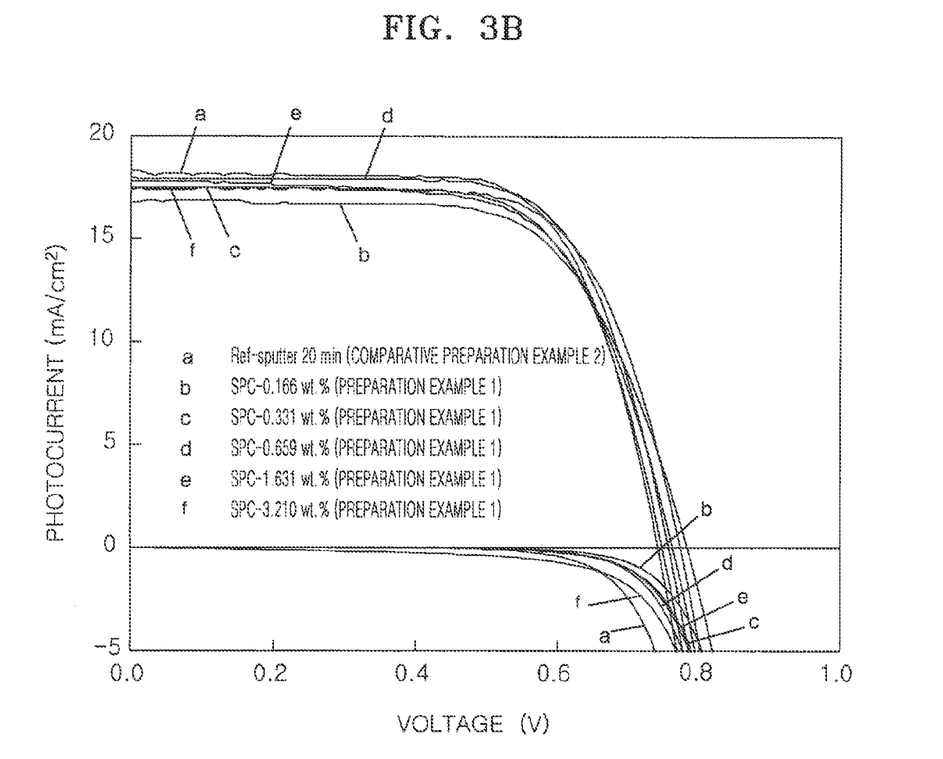
FIG. 3B is a graph illustrating current-voltage characteristics of dye sensitized solar cells prepared according to Preparation Example 1 and Comparative Preparation Example 2.

Current-voltage characteristics of the dye sensitized solar cells manufactured according to Preparation Example 1 and Comparative Preparation Examples 1 and 2 were measured using a 100 mW/cm$^2$ Xe lamp as a light source, and the results are shown in FIGS. 3A and 3B.

Referring to FIGS. 3A and 3B, it was identified that the photoelectric conversion efficiency of the dye sensitized solar cell manufactured using the platinum salt paste according to the preparation example 1 is similar to those of general solar cells manufactured by spin coating, and a photocurrent and an optical voltage may vary according to the amount of platinum.

Figure 4:
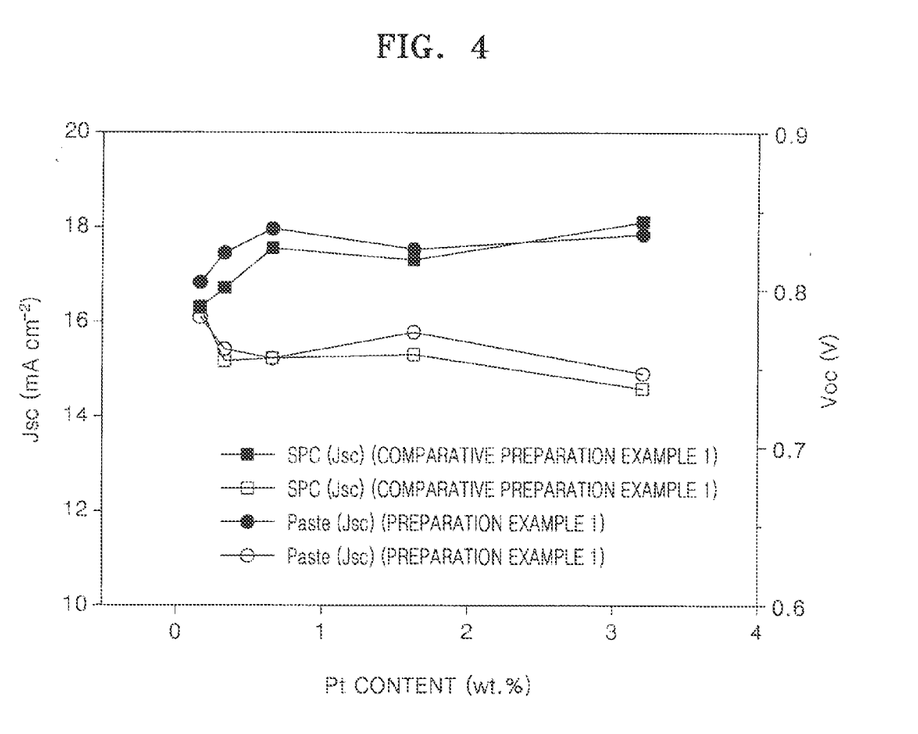
FIG. 4 is a graph illustrating a short circuit current and an open circuit voltage of dye sensitized solar cells prepared according to Preparation Example 1 and Comparative Preparation Example 1 with respect to the amount of platinum salt.

A short circuit current and an open circuit voltage of the dye sensitized solar cells including the platinum catalyst layer manufactured according to Preparation Example 1 and Comparative Preparation Example 1 with respect to the amount of the platinum salt obtained from current-voltage curve of the dye sensitized solar cells were measured, and the results are shown in FIG. 4.

Referring to FIG. 4, in Preparation Example 1 and Comparative Preparation Example 1, the short circuit current was at maximum when the amount of the platinum salt was about 0.6 wt %, and the open circuit voltage was at maximum when the amount of the platinum salt was about 1.6 wt %.

Figure 5:
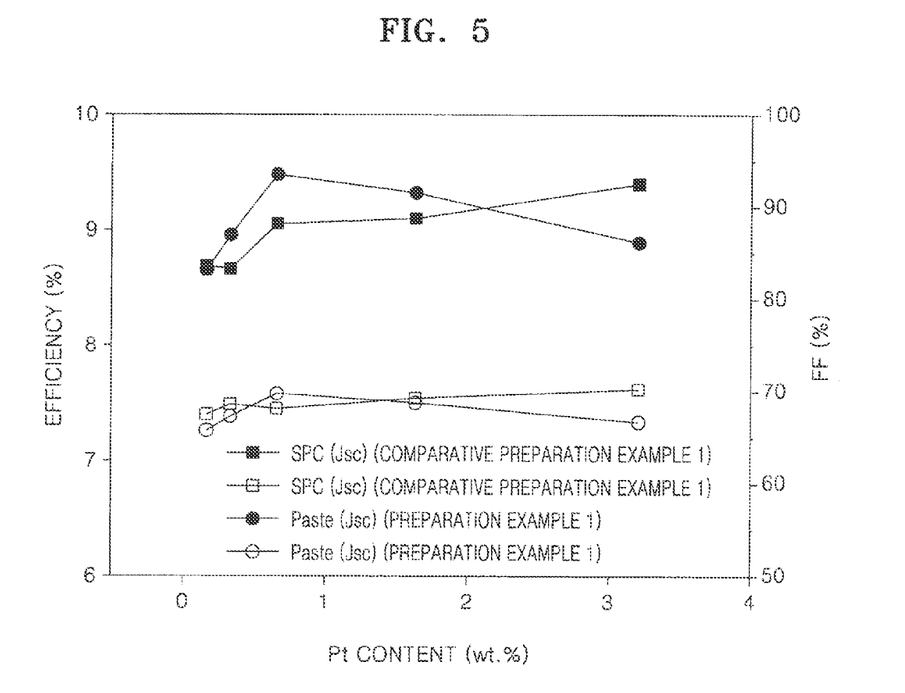
FIG. 5 is a graph illustrating photoelectric conversion efficiency and fill factor of dye sensitized solar cells prepared according to Preparation Example 1 and Comparative Preparation Example 1 with respect to the amount of platinum salt.

The photoelectric conversion efficiency and fill factor of the dye sensitized solar cells including the platinum catalyst layer manufactured according to Preparation Example 1 and Comparative Preparation Example 1 with respect to the amount of the platinum salt obtained from current-voltage curve of the dye sensitized solar cells were measured, and the results are shown in FIG. 5.

Referring to FIG. 5, in Preparation Example 1 and Comparative Preparation Example 1, the photoelectric conversion efficiency and fill factor are correlated to each other. While the photoelectric conversion efficiency was maximum when the amount of the platinum salt was about 0.6 wt % in Preparation Example 1, the amount of the platinum salt had to be increased to reach the same level of the photoelectric conversion efficiency in Comparative Preparation Example 1.

Figure 6:
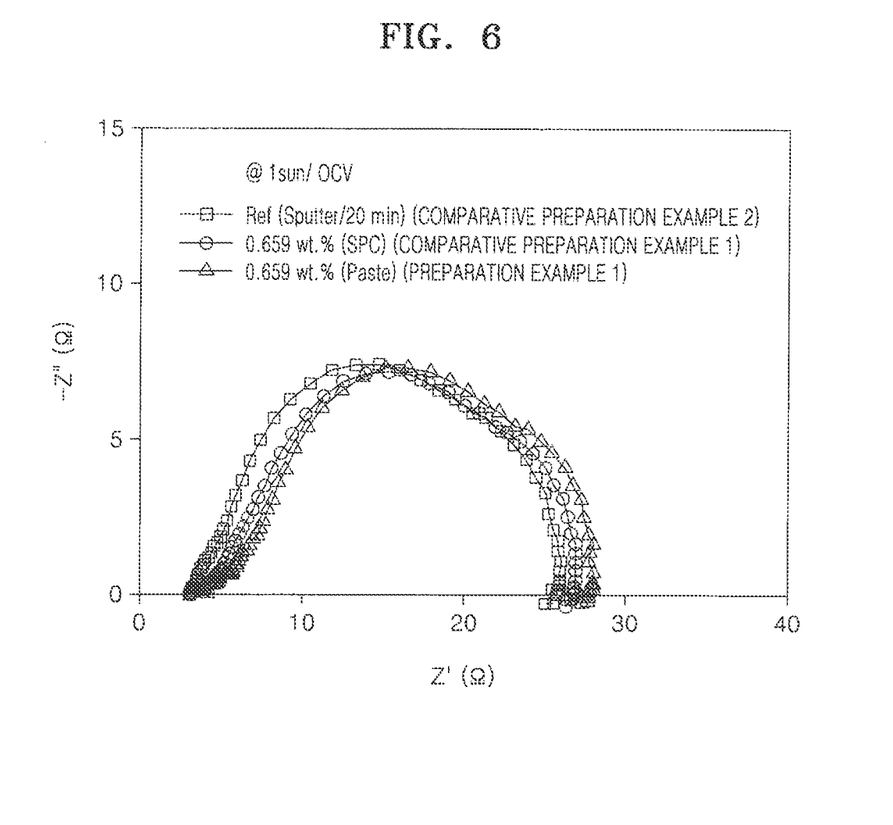
FIGS. 6 and 7 are graphs illustrating impedance characteristics of dye sensitized solar cells prepared according to Preparation Example 1 and Comparative Preparation Examples 1 and 2 under illumination and dark conditions.
Figure 7:
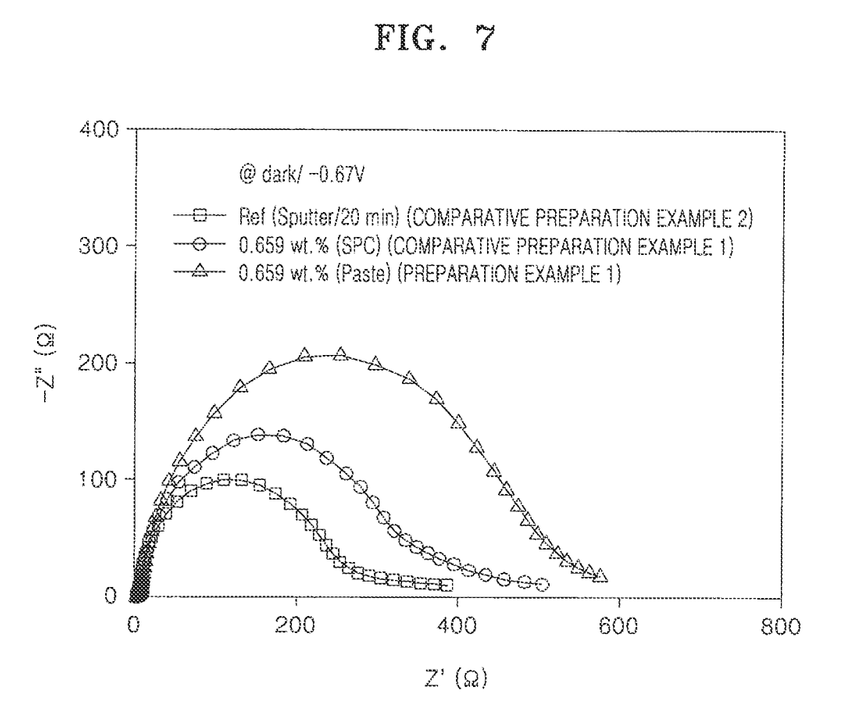

Impedance characteristics of the dye sensitized solar cells including the platinum catalyst layer prepared according to Preparation Example 1 and Comparative Preparation Examples 1 and 2 were measured, and the results are shown in FIGS. 6 and 7. FIG. 6 is a graph illustrating impedance characteristics of the dye sensitized solar cells using a 100 mW/cm$^2$ Xe lamp as a light source. FIG. 7 is a graph illustrating impedance characteristics of the dye sensitized solar cells under dark conditions.

Referring to FIG. 6, the dye sensitized solar cell prepared according to Comparative Preparation Example 2 showed relatively low sheet resistance characteristics, and impedance characteristics of the dye sensitized solar cell prepared according to Preparation Example 1 and Comparative Preparation Example 2 were similar to each other.

Referring to FIG. 7, the impedance (mid-frequency range) increased in the order of Comparative Preparation Example 2 < Comparative Preparation Example 1 < Preparation Example 1 under dark conditions.

An open circuit voltage ($V_{OC}$), photocurrent density (Jsc), energy conversion efficiency ($E_{ff}$), and fill factor (FF) of the dye sensitized solar cells manufactured according to Preparation Examples 1 and 2 and Comparative Preparation Example 2 were measured, and the results are shown in Table 5 below.

TABLE 5

| | Sample | Jsc (mA/cm$^2$) | Voc (V) | FF (%) | Eff (%) |
|---|---|---|---|---|---|
| Comparative Preparation Example 2 | Ref-Sputt-20 min | 17.741 | 0.732 | 70 | 9.09 |
| Preparation Example 1 | EC100:P123 = 10:0 (W/W) | 17.599 | 0.744 | 70.2 | 9.19 |
| Preparation Example 2 | EC100:P123 = 8:2(W/W) | 17.923 | 0.743 | 70.4 | 9.38 |
| | EC100:P123 = 6:4(W/W) | 18.197 | 0.754 | 70.2 | 9.63 |
| | EC100:P123 = 4:6(W/W) | 18.697 | 0.746 | 70.4 | 9.82 |

Figure 8:
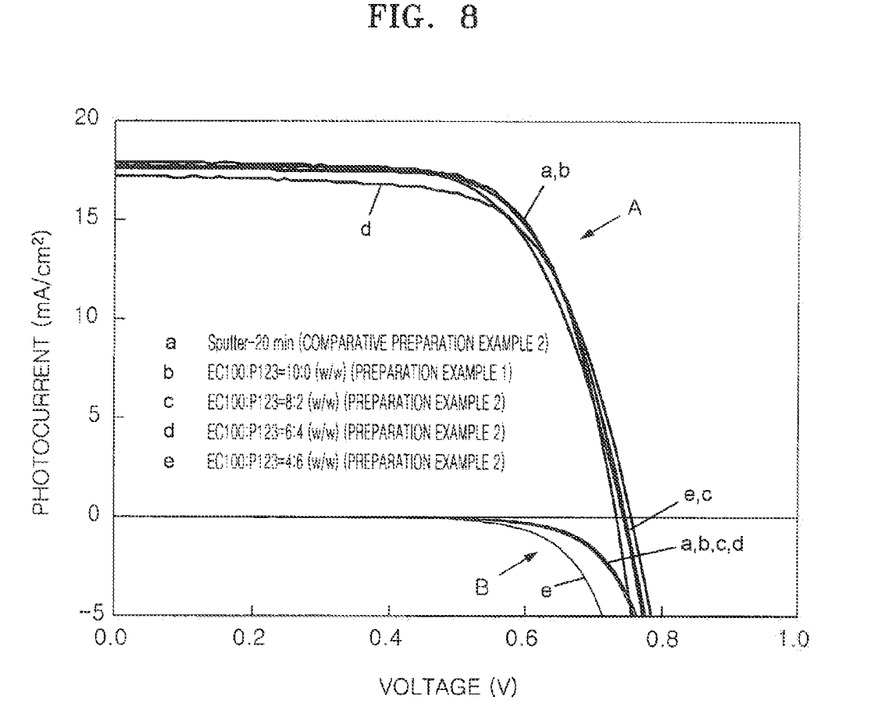
FIG. 8 is a graph illustrating current characteristics of dye sensitized solar cells prepared according to Preparation Examples 1 and 2 and Comparative Preparation Examples 2 with respect to voltage.

Current-voltage characteristics of the dye sensitized solar cells manufactured according to Preparation Examples 1 and 2 and Comparative Preparation Example 2 were measured, and the results are shown in FIG. 8.

In FIG. 8, photocurrent B that is smaller than 0 is the result obtained under dark conditions, and photocurrent A that is higher than 0 is the result obtained under illumination conditions (100 mW/cm$^2$). A dark current indicates the degree of recombination of electrons generated by the dye.

Referring to FIG. 8, the dye sensitized solar cells prepared according to Preparation Examples 1 and 2 and Comparative Preparation Example 2 have similar current-voltage characteristics. Since the dye sensitized solar cell prepared according to Comparative Preparation Example 2 includes a relatively thick platinum catalyst layer, the dye sensitized solar cells prepared according to Preparation Examples 1 and 2 have excellent catalyst characteristics in consideration of the amount of platinum.

Surface roughness of the platinum catalyst layer and BET specific surface area of the dye sensitized solar cells manufactured according to Preparation Examples 1 and 2 and Comparative Preparation Example 2 were measured, and the results are shown in Table 6 below.

TABLE 6

| | Sample | RMS (nm) | BET (m$^2$/g) |
|---|---|---|---|
| Comparative Preparation Example 2 | Ref-Sputt-20 min | 5.01 | 8.2 |
| Preparation Example 1 | EC100:P123 = 10:0 (W/W) | 14.24 | 25.3 |
| Preparation Example 2 | EC100:P123 = 8:2(W/W) | 18.31 | 30.2 |
| | EC100:P123 = 6:4(W/W) | 19.21 | 39.8 |
| | EC100:P123 = 4:6(W/W) | 21.45 | 45.3 |

Referring to Table 6, the surface roughness and specific surface area increase by adding the surfactant to the platinum salt paste. Thus, high efficiency may be obtained with a small amount of platinum.

As described above, according to the one or more of the above embodiments of the present invention, a large electrode for a dye sensitized solar cell can be prepared by enlarging the reaction area between the platinum electrode and the electrolyte by increasing the surface roughness of the platinum electrode.

By using the electrode, a dye sensitized solar cell according to an embodiment of the present invention has excellent photoelectric conversion efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a dye sensitized solar cell, the electrode having a surface roughness (RMS) in a range of about 10 to about 30 nm and comprising a platinum (Pt) catalyst having a specific surface area in a range of about 20 to about 50 $m^2/g$, and wherein the grain size of platinum is in a range of about 15 to about 30 nm.

2. The electrode of claim 1, further comprising metal oxide particles.

3. The electrode of claim 2, wherein the metal oxide comprises titania, silica, and/or indium tin oxide.

4. The electrode of claim 2, wherein the amount of the metal oxide particles is in a range of about 100 to about 500 parts by weight based on 100 parts by weight of platinum.

5. A dye sensitized solar cell comprising:
a first electrode;
a photoreceptive layer on a surface of the first electrode;
a second electrode comprising a transparent electrode and a catalyst electrode, the second electrode facing the surface of the first electrode on which the photoreceptive layer is formed; and
an electrolyte between the photoreceptive layer and the second electrode, wherein the catalyst electrode has a surface roughness (RMS) in a range of about 10 to about 30 nm and comprises a platinum (Pt) catalyst having a specific surface area in a range of about 20 to about 50 $m^2/g$, and wherein the grain size of platinum is in a range of about 15 to about 30 nm.

6. The dye sensitized solar cell of claim 5, further comprising metal oxide particles.

7. The dye sensitized solar cell of claim 6, wherein the metal oxide comprises titania, silica, and/or indium tin oxide.

8. The dye sensitized solar cell of claim 6, wherein the amount of the metal oxide particles is in a range of about 100 to about 500 parts by weight based on 100 parts by weight of platinum.

* * * * *